United States Patent
Umeda et al.

(10) Patent No.: US 8,237,543 B2
(45) Date of Patent: Aug. 7, 2012

(54) MOTORCYCLE

(75) Inventors: Yuji Umeda, Shizuoka (JP); Yasuhiro Shigeta, Shizuoka (JP); Tsuyoshi Nakamura, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 1288 days.

(21) Appl. No.: 11/697,411

(22) Filed: Apr. 6, 2007

(65) Prior Publication Data

US 2007/0285272 A1 Dec. 13, 2007

(30) Foreign Application Priority Data

Apr. 6, 2006 (JP) .................................. 2006-105645

(51) Int. Cl.
*G05B 23/00* (2006.01)
(52) U.S. Cl. ..................................................... 340/5.61
(58) Field of Classification Search .................. 340/5.61, 340/426.13; 307/10.1; 180/9.25
See application file for complete search history.

(56) References Cited

U.S. PATENT DOCUMENTS

| 6,793,110 B2 * | 9/2004 | Hamilton ....................... 224/413 |
| 6,987,446 B2 * | 1/2006 | Konno et al. ............... 340/426.1 |
| 7,656,278 B2 * | 2/2010 | Onishi et al. ............. 340/426.12 |

FOREIGN PATENT DOCUMENTS

JP 2005-119421 A 5/2005

* cited by examiner

*Primary Examiner* — Vernal Brown
(74) *Attorney, Agent, or Firm* — McDermott Will & Emery LLP (57) ABSTRACT

An electronic authentication system includes a vehicle-side control unit that judges whether ID information of an electronic key is identical to vehicle-side ID information, an ignition switch unit that permits engine starting operation and handle unlocking operation on the basis of the identity of the ID information of the electronic key to the vehicle-side ID information, and an actuator that unlocks an opening and closing lid such as a accommodation box lid. These component members are attached and fixed to a leg shield (an inner leg shield) and modularized. These members are preassembled into the inner leg shield and modularized like this, whereby the assembling work into the vehicle becomes very easy and it is possible to make the assembling work efficient to a great extent.

5 Claims, 11 Drawing Sheets

MOTORCYCLE

CROSS-REFERENCE TO RELATED APPLICATIONS

This application is based upon and claims the benefit of priority from the prior Japanese Patent Application No. 2006-105645, filed on Apr. 6, 2006, the entire contents of which are incorporated herein by reference.

BACKGROUND OF THE INVENTION

1. Field of the Invention

The present invention relates to a motorcycle, such as typically a scooter type vehicle, on which an electronic authentication system is mounted.

2. Description of the Related Art

As a motorcycle on which an electronic authentication system is mounted, there is known a motorcycle disclosed in Japanese Patent Application Laid-Open No. 2005-119421, for example. In Japanese Patent Application Laid-Open No. 2005-119421, a control unit controls a transmitting antenna so that the transmitting antenna transmits a signal that urges an authorized portable transmitter carried by the user of a vehicle to transmit an ID signal, and the signal receiving result of a receiving unit that receives the signal from the portable transmitter is input to the control unit. When the control unit has ascertained that the ID signal transmitted from the portable transmitter is a prescribed signal, the control unit causes a lock solenoid to work so as to allow the rotation operation of a cylinder lock by use of a knob.

In Japanese Patent Application Laid-Open No. 2005-119421, a handle lock module comprises a cylinder lock that allows rotation operation by use of a knob and undoes the locked condition of a steering handle to a head pipe during rotation operation, a lock solenoid capable of making the rotation of the cylinder lock incapable, a main switch that performs switching operation according to the rotation of the cylinder lock, and a control unit to which a signal from the main switch is input.

The receiving unit is disposed within a housing box or a rider's seat, and the transmitting antenna is disposed on the center line in the width direction of the vehicle above the handle lock module, for example, immediately under a panel that constitutes part of the vehicle body cover.

However, if the control unit, the receiving unit and the transmitting unit are arranged in a distributed manner as separate objects in each part of the vehicle, the efficiency with which these units are assembled into a vehicle becomes worse.

SUMMARY OF THE INVENTION

The present invention was made in view of such circumstances and the object of the invention is to make assembling work efficient in assembling an electronic authentication system into a vehicle by making the assembling work easy.

A motorcycle includes: a portable transmitter-receiver carried by a user; an ignition switch unit for enabling an engine starting operation and causing a handle of the motorcycle to be locked or unlocked; an actuator for causing a lock/unlock operation of an accommodation box lid; and a control unit for permitting an operation of the ignition switch unit and activating the actuator to unlock the accommodation box lid in consequence of matching both identification codes stored in the portable transmitter-receiver and the control unit. This motorcycle is characterized in that the actuator and the control unit are mounted on the top surface of a leg shield of the motorcycle respectively.

Another feature of the motorcycle of the present invention lies in the fact that the actuator and the control unit are disposed on both sides of the ignition switch unit in the width direction of the motorcycle respectively.

Another feature of the motorcycle of the present invention lies in the fact that the accommodation box lid covers an opening of an accommodation box formed in the leg shield, and the actuator and the control unit are mounted on the outer surface of the upper wall portion forming a part of the accommodation box.

Another feature of the motorcycle of the present invention lies in the fact that the control unit includes: a transmitting antenna for transmitting a request signal in response to an operation of an access switch installed in the ignition switch unit; and a receiving antenna for receiving a response signal transmitted from the portable transmitter-receiver.

Another feature of the motorcycle of the present invention lies in the fact that the control unit is disposed on the same side as a prop stand of the motorcycle in the width direction.

Another feature of the motorcycle of the present invention lies in the fact that the control unit includes a transmitting antenna for transmitting a request signal in response to an operation of an access switch installed in the ignition switch unit and a receiving antenna for receiving a response signal transmitted from the portable transmitter-receiver is mounted on the top surface of a leg shield on the same side as a prop stand of the motorcycle in the width direction.

Another feature of the motorcycle of the present invention lies in the fact that the actuator is mounted on the top surface of a leg shield on the other side of the control unit in the width direction, and the ignition switch unit is disposed between the actuator and the control unit in the width direction.

Another feature of the motorcycle of the present invention lies in the fact that the motorcycle has an ignition switch unit for enabling an engine starting operation and causing a handle of the motorcycle to be locked or unlocked; an actuator for causing a lock/unlock operation of an accommodation box lid; and a control unit for permitting an operation of the ignition switch unit and activating the actuator to unlock the accommodation box lid in consequence of matching user physical information capable of identifying individuals and registered physical information stored in the control unit. This motorcycle is characterized in that the actuator and the control unit are mounted on the top surface of a leg shield of the motorcycle respectively.

DETAILED DESCRIPTION OF THE INVENTION

Embodiments of the motorcycle of the present invention will be described below on the basis of the drawings.

Figure 1A:
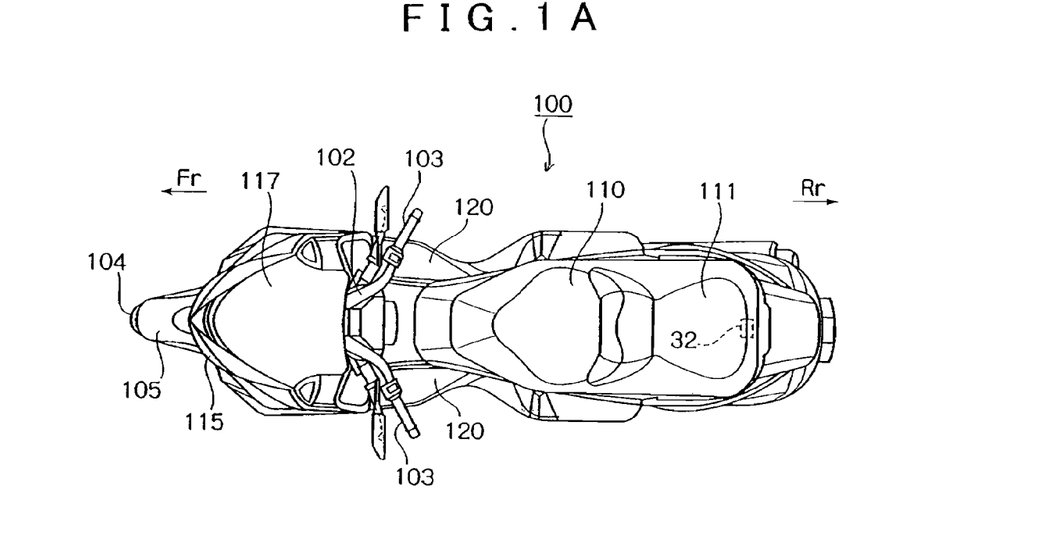
FIG. 1A is a plan view that shows an example of a motorcycle related to an embodiment of the present invention.
Figure 1B:
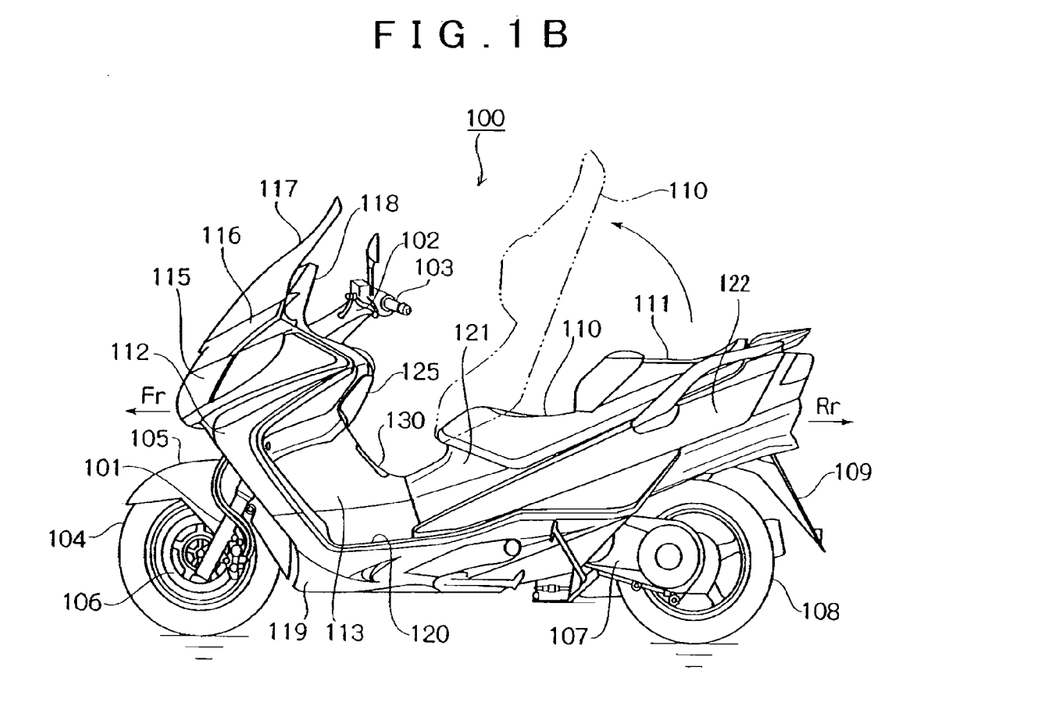
FIG. 1B is a side view that shows an example of a motorcycle related to an embodiment of the present invention.

Although the present invention is effectively applicable to various types of motorcycles, in this embodiment a description will be given of an example of what is called a scooter type vehicle, as shown in FIGS. 1A and 1B, for example. First, the general construction of a scooter type vehicle 100 related to the present invention will be described. Incidentally, in important parts of each of the drawings, the front and rear of the vehicle are indicated by the arrow Fr and the arrow Rr, respectively. In FIGS. 1A and 1B, two front forks 101 supported by a steering head pipe so as to be rotatable from side to side are provided at the front of a vehicle body frame made of a steel or aluminum alloy material. A handle 102 is fixed to the top end of the front fork 101, and there are grips 103 on both right and left ends of the handle 102. A front wheel 104 is rotatably supported in a lower part of the front fork 101, and a front fender 105 is fixed so as to cover an upper part of the front wheel 104. The front wheel 104 has a brake disk 106 that rotates integrally with the front wheel 104.

At the rear of the vehicle body frame, right and left swing arms 107 are swingably provided and a rear shock absorber is laid between the vehicle body frame and the swing arm 107. One (left side) swing arm 107 incorporates a power transmission mechanism constituted by a belt type continuous variable transmission or a plurality of gear trains. A rear wheel 108 is rotatably supported at the tail end of the swing arm 107, and the rear wheel 108 is rotatably driven via the above-described power transmission mechanism. A rear fender 109 is fixed so as to cover an upper part of the rear wheel 108.

Incidentally, although not illustrated, a mixture is supplied from an intake system including an air cleaner apparatus to an engine unit mounted on the vehicle body frame and exhaust gas after combustion is exhausted through an exhaust pipe. Furthermore, the engine unit and main component parts of the vehicle including a fuel tank and radiator are covered with a vehicle body cover, which will be described later, and as shown in FIGS. 1A and 1B, the outside construction of the vehicle has a simple design with integrality. A rider's seat 110 and a tandem seat 111 are provided in a connected row arrangement from the approximate middle to the rear of the vehicle (these seats are hereinafter referred to simply as the seat 110).

Figure 2:
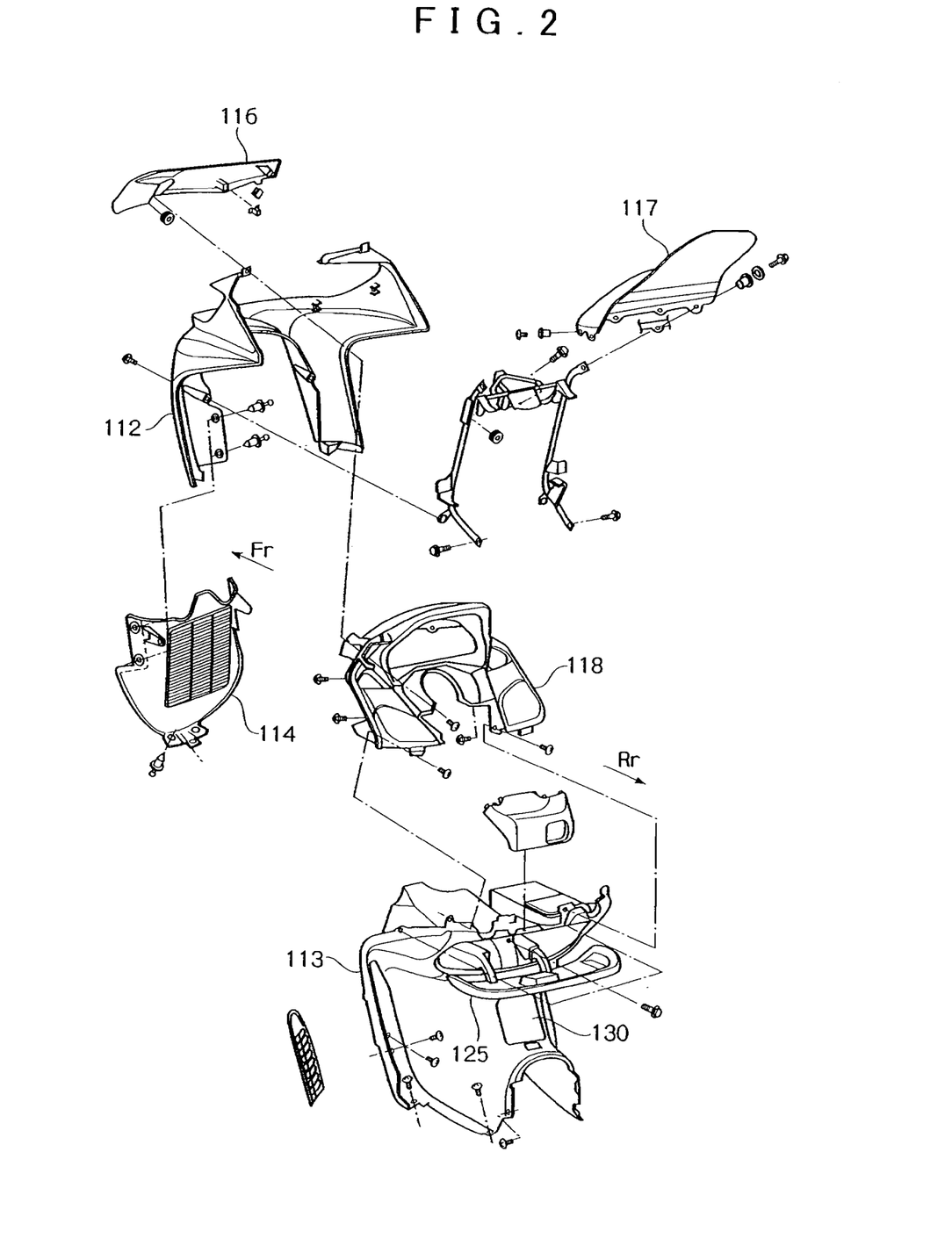
FIG. 2 is an exploded perspective view that shows an example of the construction of a vehicle body cover of a motorcycle related to an embodiment of the present invention.

Referring now to FIG. 2, the vehicle body cover of the front of the vehicle is constructed in such a manner that a front leg shield 112 that covers the front portion of the vehicle from the front in the travel direction of the vehicle and an inner leg shield 113 that covers the front portion of the vehicle from the seat 110 side in the travel direction of the vehicle are brought into continuous contact, and a lower leg shield 114 is arranged below the front leg shield 112. A head lamp 115 is arranged in the front leg shield 112 so as to be put therein. A wind screen 117 is arranged in a standing manner in an upper part of the front leg shield 112 via a front leg shield cover 116. A meter panel 118 is arranged in an upper part of the inner leg shield 113. The front leg shield 112, the inner leg shield 113 and the wind screen 117 are arranged and constructed so as to cover the handle 102 and related parts thereof including at least the leg portion of the lower part of the rider's body and the upper part of the rider's body.

Below the inner leg shield 113 are provided right and left low-floored rider's foot rest portion of the foot rest board 120 from the right and left sides toward the rear in the vicinity of the leading end part of the inner leg shield 113, and the rider can be seated on the sheet 110 by putting his or her legs on the pillion foot rest portion of the foot rest board 120. Between the right and left rider's foot rest portion of the foot rest board 120, a floor tunnel portion that protrudes upward and extends backward and forward is formed by the inner leg shield 113 and a part of a front frame cover 121, and an undercover 119 that covers the lower side of the right and left foot rest board 120 is brought into continuous contact. The engine unit is arranged within this floor tunnel portion.

The front frame cover 121 comes into continuous contact with the rear edge of the inner leg shield 113 and rises toward the lower edge of the sheet 110. Right and left side frame covers 122 and the like come into continuous contact with the rear side of the front frame cover 121. The above-described various kinds of covers are basically molded from a synthetic resin and attached and fixed to the vehicle body frame directly or via supports such as a bracket.

Figure 3:
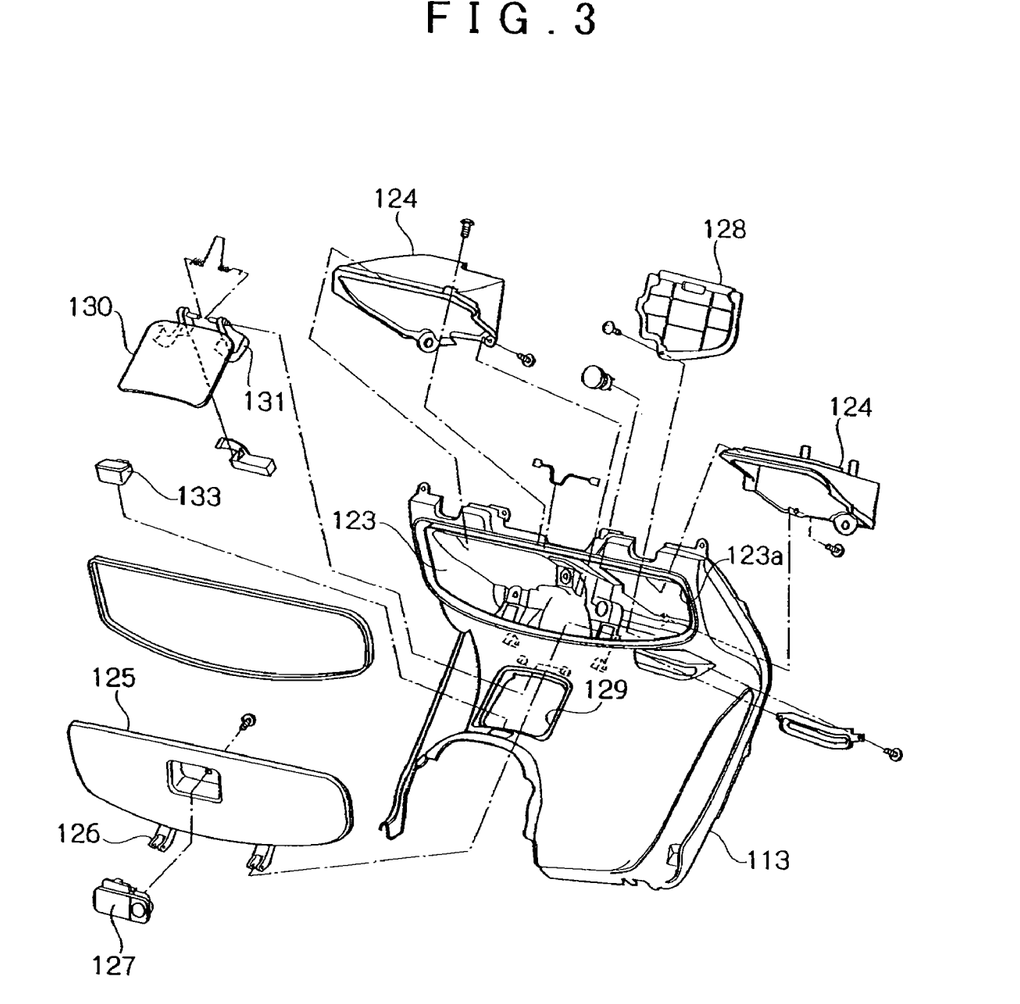
FIG. 3 is an exploded perspective view that shows an example of the construction of a leg shield and related parts thereof in an embodiment of the present invention.

Next, FIG. 3 shows an example of the construction of the inner leg shield 113 and related parts thereof. The rough construction is such that the floor tunnel portion is formed in the lower part, whereas an accommodation box 123 is integrally provided in a protruding manner in the upper part, with an opening 123a that opens toward the sheet 110 side in the travel direction of the vehicle. In an upper portion of the accommodation box 123, a pair of right and left covers 124 for forming a ceiling wall (upper wall portion) join together, and an accommodation box lid 125 closes the opening 123a of the accommodation box 123 via arms 126 so as to be able to open and close the opening 123a (refer also to FIG. 4A).

The ceiling wall of the accommodation box 123, i.e., the top surface of each of the covers 124 is formed flat and is arranged substantially horizontally. And a vehicle-side control unit 10 and an actuator 21 of the accommodation box lid 125 or the like are attached and fixed to the top surface of the cover 124, as will be described later. By attaching the vehicle-side control unit 10 and the actuator 21 to the horizontal surface that has appropriate flexibility like this, vibrations (road vibrations and the like) that act particularly in the perpendicular direction are damped. Therefore, it is possible to improve the endurance of the vehicle-side control unit 10 and the actuator 21 of the accommodation box lid 125 or the like.

The accommodation box lid 125 can be opened by operating an accommodation box lid opener 127. In this case, as will be described later, there is provided an opening operation restricting mechanism (a lock mechanism) that restricts the opening of the accommodation box lid 125 by making ineffective the opening operation of the accommodation box lid opener 127. The opening operation by the accommodation box lid opener 127 becomes effective by releasing this opening operation restricting mechanism (the lock mechanism) and it becomes possible to open the accommodation box lid 125. When the accommodation box lid 125 is opened, there is a battery (not shown) in the deep recess of the accommodation box 123. In this case, the battery is housed on the inner side of a battery box lid 128 (in front of the battery box lid 128) so that the battery is not exposed in a normal state.

An opening 129 for making access to an oil filler port of a fuel tank is provided on the top surface of the floor tunnel portion below the accommodation box 123, and a fuel lid 130 (a fuel lid) closes this opening 129 via arms 131 so as to be able to open and close the opening 129 (refer also to FIG. 4B). As shown in FIG. 4B, on the inner side of the fuel lid 130, a cap 132 for plugging the oil filler port of the fuel tank is provided and the cap 132 can be removed by opening the fuel lid 130.

The fuel lid 130 can be opened by operating a fuel lid opener 133. In this case, as will be described later, there is provided an opening operation restricting mechanism (a lock mechanism) that restricts the opening of the fuel lid 130 by making ineffective the opening operation of the fuel lid opener 133, and the opening operation of the fuel lid opener 133 becomes effective by releasing this opening operation restricting mechanism (the lock mechanism) and it becomes possible to open the fuel lid 130.

As described above, since the leg shield is provided with the accommodation box 123 and the accommodation box lid 125, the large inner space of the leg shield is efficiently available for the utility space. Referring to FIG. 1B, the seat 110 is attached to as to be rotatable around a supporting point provided in the vicinity of the leading end part, and below the seat 110 there is formed a housing portion that is surrounded by the right and left side frame covers 122 and has a capacity larger than the accommodation box 123. This housing portion is opened and closed by the rotation of the seat 110 and a seat unlocking mechanism 30 that allows the opening of the seat 110 is provided.

Next, an outline of an electronic authentication system provided in a scooter type vehicle 100 of this embodiment will be given. In this electronic authentication system, an authentication request signal is sent out from the vehicle-side control unit 10 by operating an access switch 16, and an authentication response signal including ID information (identification code) is output from a portable electronic key 13 (portable transmitter-receiver) in response to this authentication request signal. And the authentication response signal is received by the vehicle-side control unit 10 and judgment is passed as to whether the ID information is identical. When it has been judged that the ID information is identical, the operation of the vehicle is allowed.

Figure 5:
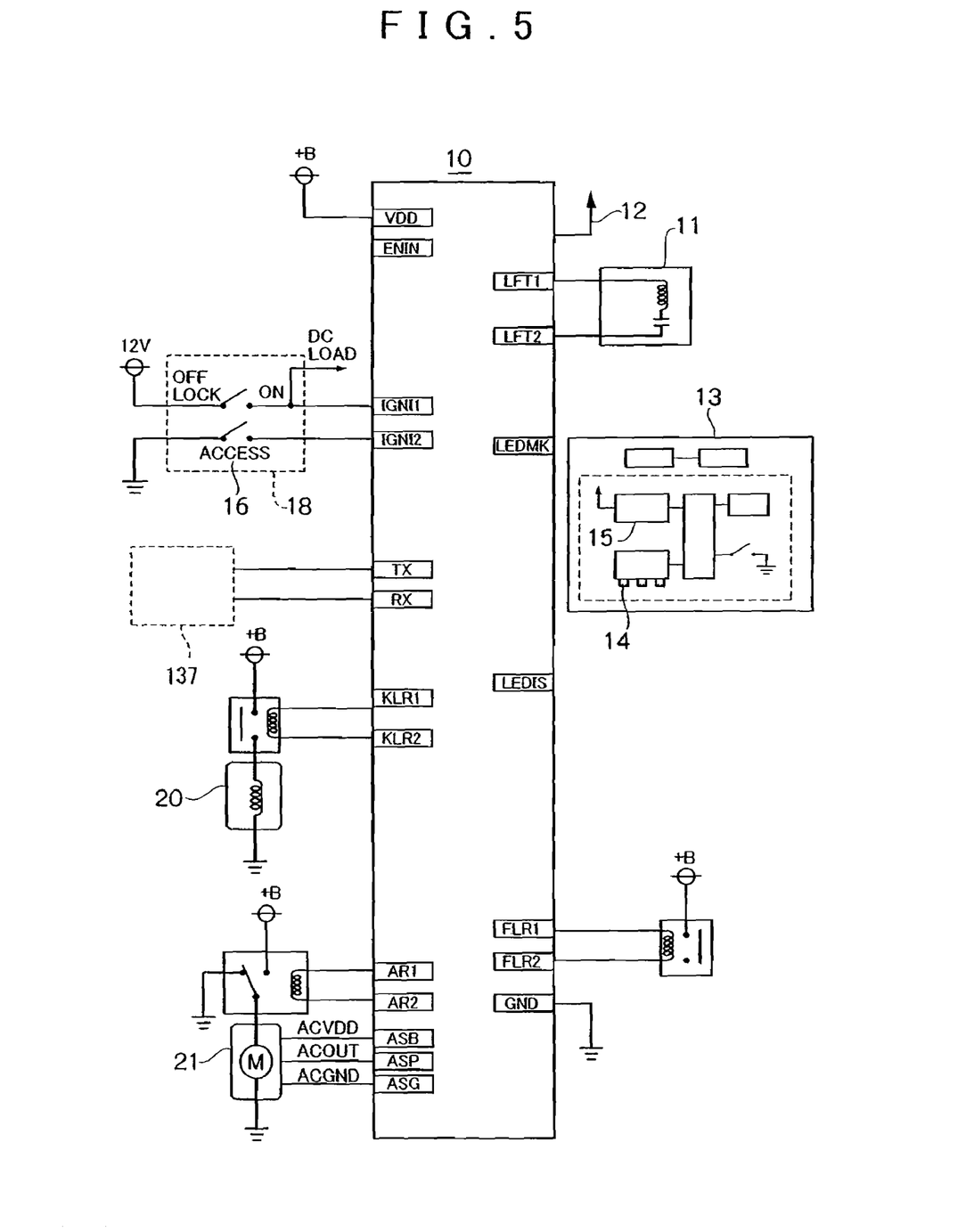
FIG. 5 is a diagram that shows an example of the construction of an electronic authentication system related to an embodiment of the present invention.

In this electronic authentication system, as shown in FIG. 5, a transmitting antenna 11 that transmits an authentication request signal for electronic authentication and a receiving antenna 12 that receives an authentication response signal are connected to the vehicle-side control unit 10. On the other hand, a transmitter-receiver including a receiving antenna 14 that receives an authentication request signal, a transmitting antenna 15 that transmits an authentication response signal and the like is incorporated in an electronic key 13 (refer to FIGS. 6A to 6C). The electronic authentication system starts electronic authentication by the ON operation of the access switch 16. An authentication request signal is sent out from the transmitting antenna 11, the authentication request signal is received by the receiving antenna 14 of the electronic key 13, and an authentication response signal is transmitted from the transmitting antenna 15 in response to the authentication request signal. This authentication response signal is received by the vehicle-side receiving antenna 12, and in the vehicle-side control unit 10, judgment is passed as to whether the ID information is identical. When electronic authentication has been obtained, the operation of an ignition knob 19 of an ignition switch unit 18, which will be described later, is allowed.

Figure 6A:
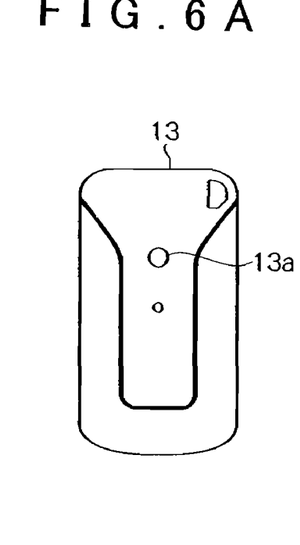
FIG. 6A is a diagram that shows an example of the construction of an electronic key related to an embodiment of the present invention.
Figure 6B:
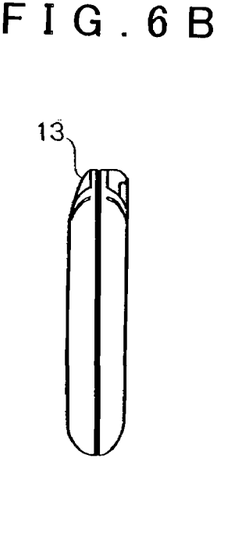
FIG. 6B is a diagram that shows an example of the construction of an electronic key related to an embodiment of the present invention.
Figure 6C:
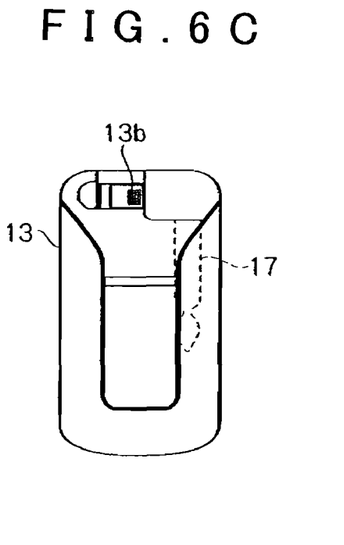
FIG. 6C is a diagram that shows an example of the construction of an electronic key related to an embodiment of the present invention.

Incidentally, as shown in FIGS. 6A to 6C, the electronic key has an operation button (or an operation switch) 13a, and by depressing this operation button 13a, the start and stop of the electronic authentication function becomes possible. During the standstill of the electronic authentication function, even when the access switch 16 is operated, with the electronic key 13 placed in a range that permits communication with the vehicle-side control unit 10, electronic authentication cannot be obtained, because the electronic key 13 does not receive an authentication request signal from the vehicle-side control unit 10. An emergency unlocking key 17 is internally mounted in the electronic key 13, and this emergency unlocking key 17 can be removed by operating a key lever 13b.

Figure 4A:
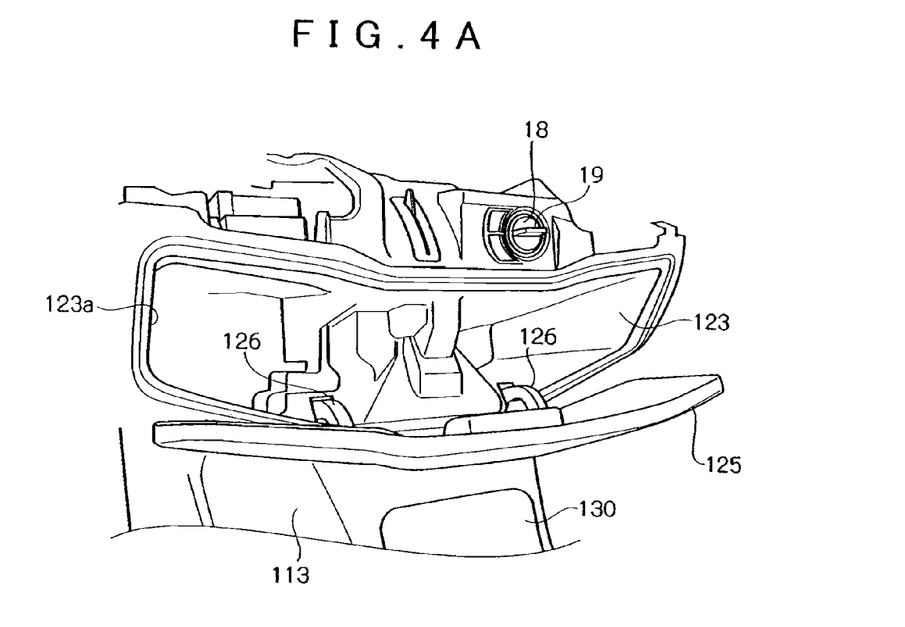
FIG. 4A is a perspective view that shows a housing box and related parts thereof in an embodiment of the present invention.
Figure 4B:
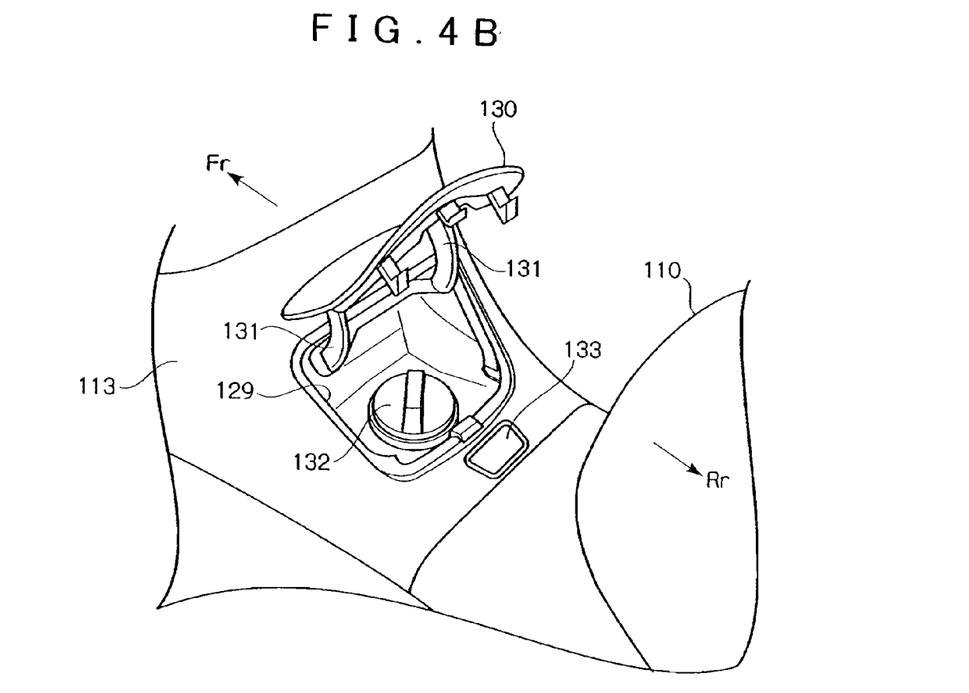
FIG. 4B is a perspective view that shows a fuel lid and related parts thereof in an embodiment of the present invention.

As shown also in FIG. 4A, above the accommodation box 123, the ignition knob 19 (refer to FIG. 7), which is an operation element of the ignition switch unit 18, is arranged in a somewhat right position of the vehicle so as to protrude appropriately from the leg shield inner 113 to the seat 110 side. Incidentally, the ignition switch unit 18 is disposed approximately along the fore-and-aft direction of the vehicle within a space covered with the front leg shield 112, the inner leg shield 113 and a meter panel 118, and extends to the vicinity of the right side of the steering head pipe. The ignition knob 19 is constructed so as to permit rotation operation and push operation, and this push operation causes the ON operation of the access switch 16 installed in the ignition switch unit 18.

Figure 7:
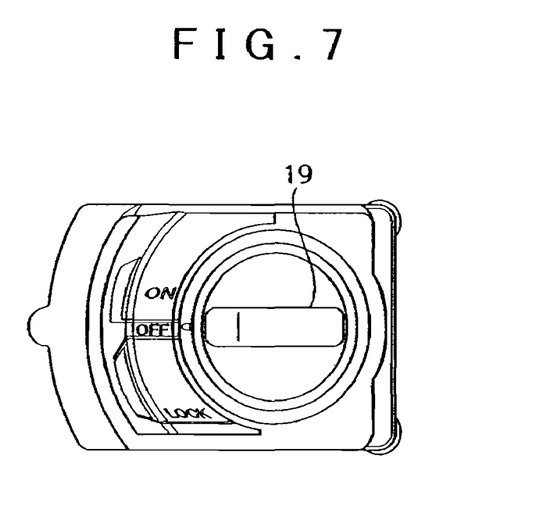
FIG. 7 is a diagram that shows an example of the construction of an ignition knob related to an embodiment of the present invention.

Furthermore, the electronic authentication system has a solenoid 20 that unlocks a lock mechanism 22 that restricts the rotation of the ignition knob 19, which will be described later, and an actuator 21 that unlocks lock mechanisms 26, 27 that restrict the opening of the accommodation box lid 125 and the fuel rid 130. These solenoid 20 and actuator 21 are controlled by the vehicle-side control unit 10.

As shown in FIG. 7, the ignition knob 19 is constructed so as to be able to take "LOCK," "OFF," and "ON" positions by rotation operation. Also, the ignition knob 19 can take the intermediate position between "OFF" and "ON" by push-rotation operation.

Figure 8:
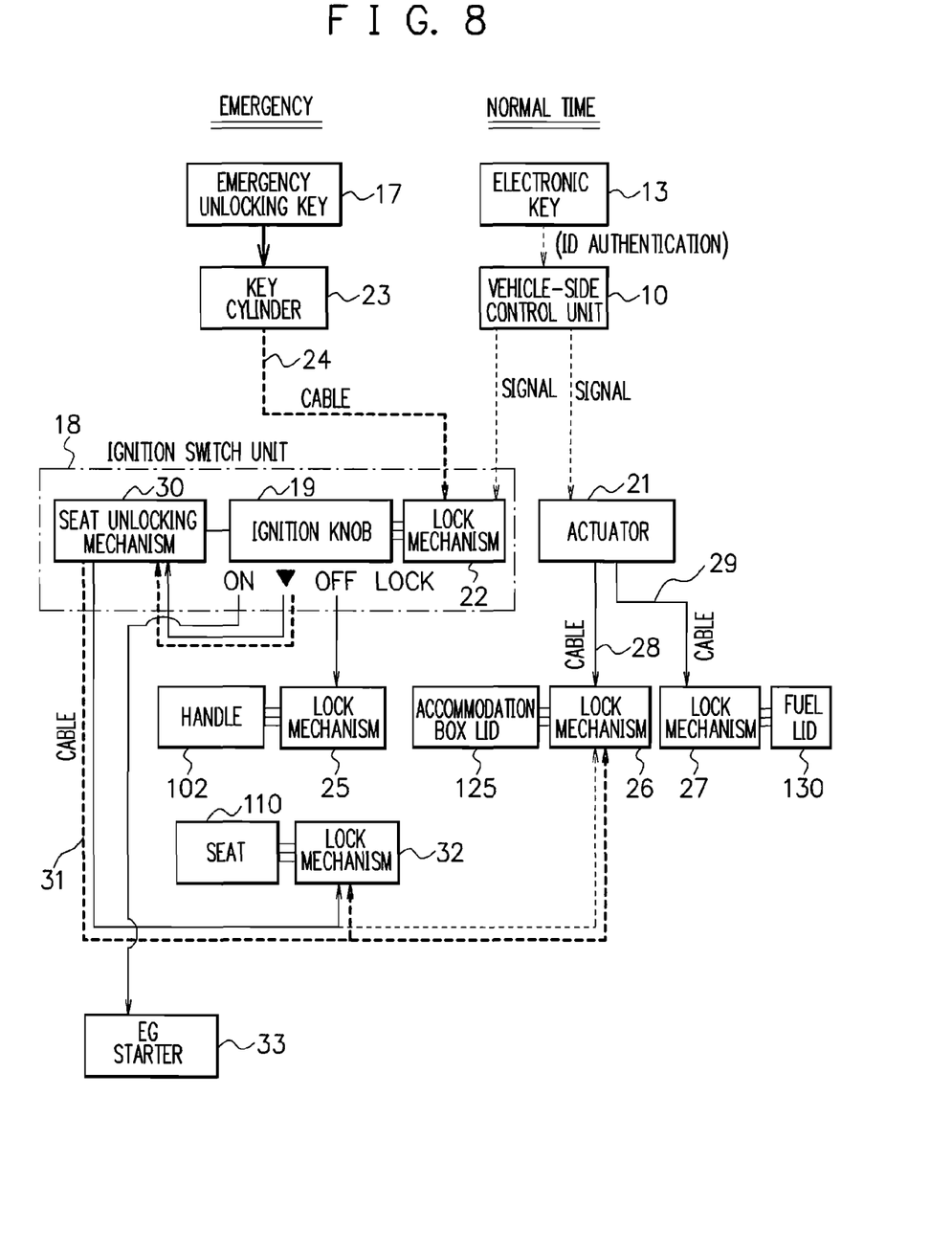
FIG. 8 is a diagram that shows an example of the system configuration in an embodiment of the present invention.
Figure 9:
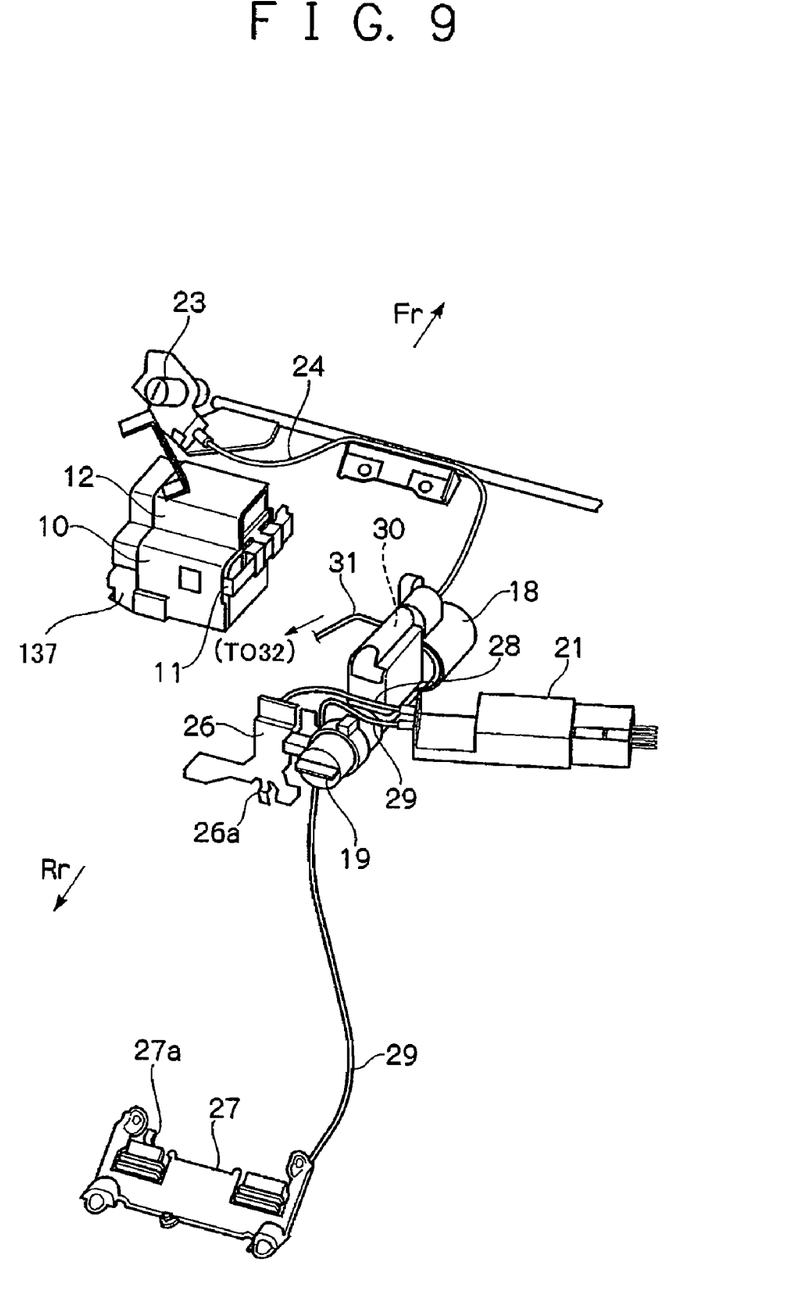
FIG. 9 is a diagram that shows an example of the hardware system configuration in an embodiment of the present invention.

Next, referring to FIGS. 8 and 9, the lock mechanism 22 of the ignition knob 19 is incorporated in the casing of the ignition switch unit 18 and locks the ignition knob 19 in "LOCK" or "ON" position. For the lock mechanism 22, locking and unlocking are performed by causing the solenoid 20 (FIG. 5) to be actuated by an electric signal from the vehicle-side control unit 10.

Furthermore, the locking by the lock mechanism 22 can also be unlocked by the operation of the emergency unlocking key 17. In this embodiment, there is provided a key cylinder 23 for emergency unlocking capable of being operated by the emergency unlocking key 17, and this key cylinder 23 is mechanically connected to the lock mechanism 22 via a cable 24 for emergency unlocking.

The ignition switch unit 18 is integrally provided with a lock mechanism 25 that restricts the rotation of the handle 102 connecting to the front fork 101. This lock mechanism 25 has a lock pin that moves forward and backward with respect to a steering shaft of the front fork 101 supported by the steering head pipe, for example, by the rotation operation of the ignition knob 19, and by rotating the ignition knob 19 from "LOCK" position to "OFF" position, it is possible to unlock the locking by the lock mechanism 25.

The lock mechanism 26 of the accommodation box lid 125 is arranged in the vicinity of the left side of the ignition switch unit 18. The lock mechanism 26 has a lock claw 26a, and the lock claw 26a is disposed in the opening 123a of the accommodation box 123 and engages with the back side of the accommodation box lid 125 (the front side of the vehicle). And the opening operation of the accommodation box lid opener 127 is made ineffective by the engagement of the lock claw 26a with the accommodation box lid 125. As shown also in FIG. 10, the lock mechanism 26 is connected to the actuator 21 via a cable 28. The actuator 21 incorporates a motor as the drive source thereof and has a slide piece 21a that performs reciprocating motion (refer to FIG. 10 and the two-headed arrow and the alternate long and two short dashes line) so as to tension and loosen the cable 28. By pulling the cable 28 via this slide piece 21a, it is possible to perform the locking by the lock mechanism 26 and to unlock the locking by the lock mechanism 26 by causing the lock claw 26a thereof to move forward and backward.

Figure 10:
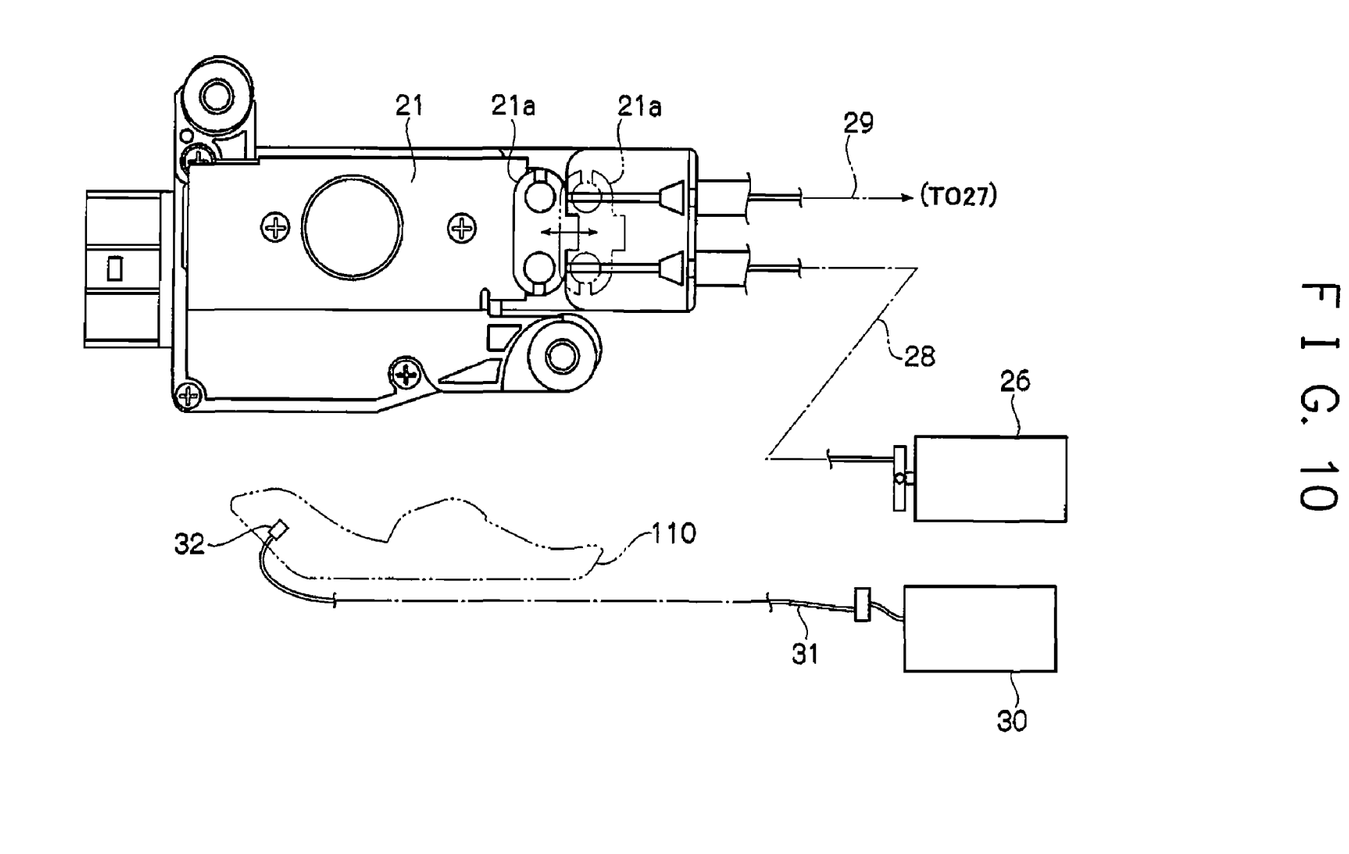
FIG. 10 is a diagram that shows an example of the construction of an actuator related to an embodiment of the present invention.

The lock mechanism 27 of the fuel lid 130 has a lock claw 27a, and the lock claw 27a is disposed in the opening 129 and engages with the back side of the fuel lid 130. And the opening operation of the fuel lid opener 133 is made ineffective by the engagement of the lock claw 27a with the fuel lid 130. The lock mechanism 27 is connected to the actuator 21 via a cable 29. By pulling the cable 29 via the slide piece 21a, it is possible to perform the locking by the lock mechanism 27 and to unlock the locking by the lock mechanism 27 by causing the lock claw 27a thereof to move forward and backward.

Furthermore, in this embodiment, the accommodation box lid 125 and the seat 110 can be unlocked by the rotation operation of the ignition knob 19. As shown in FIGS. 8 and 10, the ignition switch unit 18 incorporates a seat unlocking mechanism 30 for unlocking the seat 110. An end of a cable 31 for seat unlocking is connected to this seat unlocking mechanism 30, and other end of the cable 31 branches into two, which are mechanically connected to a lock mechanism 32 of the seat 110 (refer to FIG. 1A) and the lock mechanism 26 of the accommodation box lid 125, respectively.

The seat unlocking mechanism 30 is actuated by the push-rotation of the ignition knob 19 from "OFF" position thereof to the intermediate position (▼) between "OFF" position and "ON" position, whereby it is possible to unlock the locking by both of the lock mechanisms 26 and 32 of the accommodation box lid 125 and the seat 110. When electronic authentication has been obtained, the ignition knob 19 is rotated from "OFF" position to "ON" position and the engine can be started by the operation of an engine starter.

Figure 11:
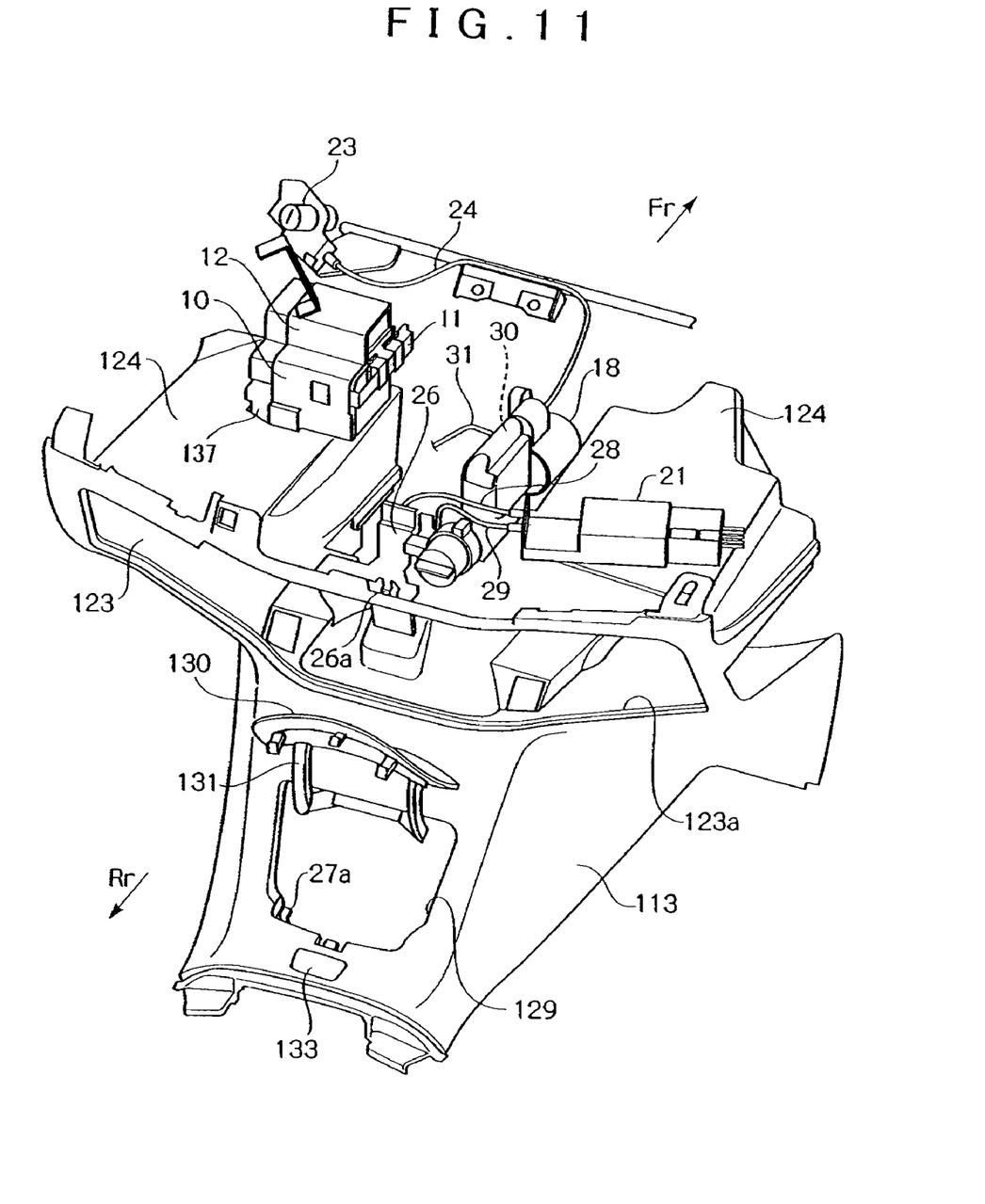
FIG. 11 is a perspective view that shows a modularized led shield and related parts thereof related to an embodiment of the present invention.

As described above, the electronic authentication system includes the vehicle-side control unit 10, the ignition switch unit 18, the lock mechanisms 26, 27 of the accommodation box lid 125 and the fuel lid 130, and the actuator 21. As shown in FIG. 11, these component members are attached and fixed to the leg shield (inner leg shield 113) and modularized.

In the assemblage of the electronic authentication system into a vehicle, these members are preassembled into the inner leg shield 113 and modularized, whereby the assembling work into the vehicle becomes very easy and it is possible to make the assembling work efficient to a great extent.

In this case, an engine control unit 137, the vehicle-side control unit 10, the transmitting antenna 11 and the receiving antenna 12 are integrated. Specifically, the vehicle-side control unit 10 is placed on the engine control unit 137 and covered with a resin cover, with the receiving antenna 12 placed on top of the vehicle-side control unit 10. The transmitting antenna 11 is disposed in the side portion of the vehicle-side control unit 10. The vehicle-side control unit 10 into which the transmitting antenna 11 and the receiving antenna 12 are integrated like this is arranged on the left side of the vehicle where a prop stand is disposed. In an actual use, because the user of a vehicle often rides from the left side of the vehicle where the vehicle inclines with the prop stand in use, the electronic key 13 carried by the user and the transmitting and receiving antennas of the vehicle-side control unit 10 are adjacent each other. Therefore, it is possible to miniaturize the transmitter-receiver.

The ignition switch unit 18 and the actuator 21 are arranged on the right side of the steering head pipe, the ignition switch unit 18 is attached to the steering head pipe, and the actuator 21 is attached to the top surface of the ceiling wall of the accommodation box 123. As already described, the ignition switch unit 18 and the actuator 21 are connected to the lock mechanism 26 of the accommodation box lid 125 via the cables 28, 31, respectively. By arranging the ignition switch unit 18, the actuator 21 and the cables 28, 31 on one side (the right side) of the vehicle, the cables and the like are less apt to interfere with work and it is possible to prevent the cables and the like from impairing the assemblability of the inner leg shield 113.

Figure 12A:
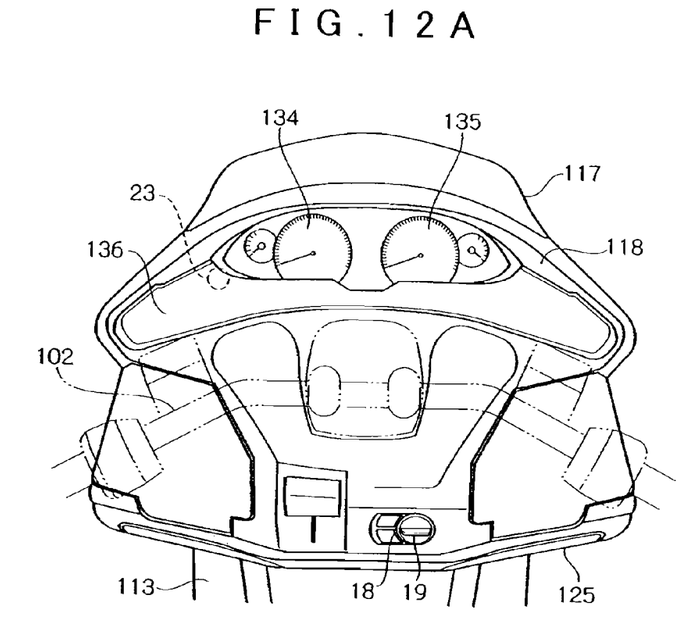
FIG. 12A is a plan view that shows the exemplary arrangement of a key cylinder for emergency unlocking in an embodiment of the present invention.
Figure 12B:
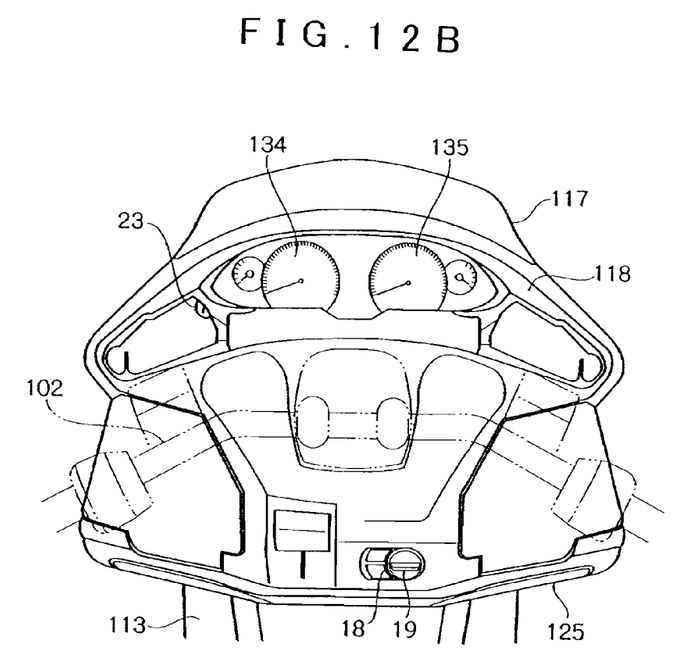
FIG. 12B is a plan view that shows the exemplary arrangement of a key cylinder for emergency unlocking in an embodiment of the present invention.

Next, in this embodiment, the key cylinder 23 for emergency unlocking capable of being operated by use of the emergency unlocking key 17 is covered with a lid member (a cover 136) that is attachable and detachable without a tool. That is, as shown in FIGS. 12A and 12B, a speedometer 134 and a tachometer 135 are mounted on the meter panel 118 arranged on the upper portion of the inner leg shield 113, and a cover 136 is attached in a broadening manner on the front side of the meter panel 118 (on the seat 110 side). As in the illustrated example, the key cylinder 23 is arranged on the speedometer 134 side and covered with the cover 136, which is a lid member. Therefore, the key cylinder 23 is not exposed.

As shown in FIG. 12B, the key cylinder 23 becomes exposed by removing the cover 136, and in this state operation by the emergency unlocking key 17 becomes possible. Incidentally, the cover 136 can be mounted on a meter panel 118 in a clip type manner so as to be capable of being easily attached and detached. In this case, a plurality of (for example, four) bosses are provided at substantially equal intervals along the longitudinal direction of the cover 136 (the lateral direction of the vehicle) and a clip is integrally formed at the leading end of each of the bosses.

Referring to FIG. 8, operational procedures of regular electronic authentication and the operation of the electronic authentication will be described below. The access switch 16 becomes on when the user carrying the electronic key 13 depresses the ignition knob 19, and this starts electronic authentication. An authentication request signal is sent out from the transmitting antenna 11 of the vehicle-side control unit 10, this authentication request signal is received by the receiving antenna 14 of the electronic key 13, and an authentication response signal is transmitted from the transmitting antenna 15 in response to the authentication request signal. Judgment is passed at the vehicle-side control unit 10 as to whether the ID information is consistent with the authentication response signal received by the receiving antenna 12. When electronic authentication has been obtained, an electric signal is output from the vehicle-side control unit 10 to the lock mechanism 22 of the ignition knob 19, the locking by the lock mechanism 22 is unlocked, and the rotation operation of the ignition knob 19 is allowed.

Similarly, when electronic authentication has been obtained, an electric signal is output from the vehicle-side control unit 10 to the actuator 21 in parallel with the above-described signal output, and then the lock mechanisms 26, 27 of the accommodation box lid 125 and the fuel lid 130 are each unlocked via the cables 28, 29. As a result, it is possible to open the accommodation box lid 125 and the fuel lid 130 by operating the accommodation box lid opener 127 and the fuel lid opener 133, respectively.

By the push-rotation operation of the unlocked ignition knob 19 from "LOCK" position to "OFF" position, the handle locking by the lock mechanism 25 of the handle 102 becomes unlocked. After the unlocking of the handle, the ignition knob is rotated from "OFF" position to "ON" position, whereby it is possible to start the engine by the operation of the engine starter 33.

Furthermore, as required, it is possible to unlock the seat 110 (and the lock mechanism 26 of the accommodation box lid 125). In this case, by the push-rotation of the ignition knob 19 from "OFF" position thereof to the intermediate position (▼), the locking by the lock mechanism 32 is unlocked via the cable 31. Incidentally, for the locking by the lock mechanism 26 of the accommodation box lid 125, unlocking has already been performed and the operation via the cable 31 becomes ineffective.

Next, operational procedures of emergency unlocking and the operation of the emergency unlocking will be described below. In this case, usually, by removing the cover 136 that covers the side of the speedometer 134 facing the rider as shown in FIG. 12A, the key cylinder 23 becomes exposed as shown in FIG. 12B. Incidentally, the removal of the cover 136 can be easily performed. In this state the operation by the emergency key 17 becomes possible, that is, first, by the operation of the emergency unlocking key 17, the locking by the lock mechanism 22 of the ignition knob 19 becomes unlocked via the cable 24 on a route separate from that of the vehicle-side control unit 10.

Because the locking by the lock mechanism 22 of the ignition knob 19 becomes unlocked, the rotation operation of the ignition knob 19 becomes possible and by rotating the ignition knob 19 from "LOCK" position to "OFF" position, the locking of the handle by the lock mechanism 25 of the handle 102 becomes unlocked. Furthermore, by the push-rotation of the ignition knob 19 from "OFF" position thereof to the intermediate position (▼), the locking by the lock mechanisms 32, 26 of the seat 110 and the accommodation box lid 125 becomes unlocked via the cable 31. As a result, it is possible to open the seat 110 and the accommodation box lid 125.

As described above, in the emergency unlocking system, the key cylinder 23 for emergency unlocking is provided on the vehicle side and the operation of the key cylinder 23 for emergency unlocking is transmitted by the cable 24, whereby the locking by the lock mechanism 22 of the ignition knob 19 is unlocked. As a result, the rotation operation of the ignition knob 19 is allowed and it becomes possible to unlock the locking of the handle and the seat.

In the unlocking operation of the seat, the rotation operation of the ignition knob 19 is transmitted by the cable 31 for seat unlocking, whereby the locking by the lock mechanism 32 of the seat 110 is unlocked. The cable 31 for seat unlocking is such that one end thereof is connected to the seat unlocking mechanism 30 of the ignition switch unit 18 and other end thereof branches into two, which are mechanically connected to the lock mechanisms 32, 26 of the seat 110 and the accommodation box lid 125, respectively.

On the other hand, in a case where the unlocking operation of the seat is performed by the operation of the key cylinder 23 for emergency unlocking, electronic authentication has not been obtained before that, and the actuator 21 is not driven. For this reason, the locking by the lock mechanism 26 of the accommodation box lid 125 become unlocked only after the cable 31 for seat unlocking is drawn and the opening operation of the accommodation box lid opener 127 becomes allowed.

That is, in the case of regular electronic authentication, the opening of the accommodation box lid 125 and the fuel lid 130 is allowed simultaneously with the completion of the electronic authentication, and by the operation of the ignition knob 19 performed after that, the unlocking of the handle and the unlocking of the seat are performed in order. In contrast, in the case of the use of the emergency key 17, handle unlocking is performed after the rotation operation of the ignition knob 19 is allowed, and the seat unlocking operation is performed thereafter, whereby the seat is unlocked and simultaneously with this, the opening of the accommodation box lid 125 by the opening operation of the accommodation box lid opener 127 is allowed.

The key cylinder 23 for emergency unlocking is provided with an automatic return mechanism that constantly biases the key cylinder 23 in the off direction. This is because if there is no automatic return mechanism, there is a possibility that the lock mechanism 22 of the ignition knob 19 may be held in the unlocking position due to vibrations and the like during travel, with the result that there is a fear that the rotation operation of the ignition knob 19 may be allowed even after the owner leaves the vehicle and the system is stopped. In the seat unlocking operation by the emergency unlocking key 17, it is necessary to operate the ignition knob 19 and the accommodation box lid opener 127 simultaneously with both hands. Therefore, by providing a holding mechanism that holds the key cylinder 23 for emergency unlocking in the ON operation position, it becomes possible to operate the ignition knob 19 and the accommodation box lid opener 127, with the hand kept off the key cylinder 23 for emergency unlocking.

The key cylinder 23 for emergency unlocking is covered with the cover 136 so that the key cylinder 23 is not exposed to the outside and, therefore, it is ensured that the position of the key cylinder 23 is not easily discovered by a third party. The cover 136 is positioned on the side of the meter facing the rider with the longitudinal direction thereof being the vehicle width direction, and within a space in the deep recess of the cover 136 is also disposed a fuse box in addition to the key cylinder 23 for emergency unlocking. The cover 136 is of a clip type and can be easily attached to the vehicle body cover and detached therefrom.

Because the rotation operation of the ignition knob 19 is allowed by the emergency unlocking key 17, as a matter of course the locking by the lock mechanism 25 of the handle 102 can also be unlocked. Because electronic authentication is not performed in this case, the engine cannot start even when the ignition knob 19 is moved to "ON" position thereof and the ON operation of the engine start switch is performed. Therefore, it is possible to prevent theft by those who do not have the regular electronic key. Furthermore, because the opening operation of the fuel lid 130 is not allowed with the emergency unlocking key 17, it is possible to prevent the fuel from being stolen.

In contrast, the access to the accommodation box 123 closed with the accommodation box lid 125 and to the personal property housing chamber under the seat 110, is made possible by the operation of the emergency unlocking key 17. Therefore, it is possible not only to restore the electronic authentication system by battery replacement, but also to secure valuables before the battery take-out work is carried out. Particularly, small articles, such as a purse and a cellular phone, are often put in the accommodation box 123 closed with the accommodation box lid 125 and even a rider who cannot replace the battery can call a serviceperson by cellular phone or bring back valuables such as a purse.

Although the present invention along with the embodiments was described above, the present invention is not limited to these embodiments and changes and the like are possible within the scope of the invention. For example, the present invention is applicable also to a system that uses biological authentication by bodily information capable of identifying individuals in place of the electronic authentication by use of the electronic key 13.

According to the present invention, in assembling an electronic authentication system into a vehicle, the vehicle-side control unit and the unlocking actuator are beforehand assembled and modularized into the leg shield, whereby the assembling work into the vehicle becomes very easy and it is possible to make the assembling work efficient to a great extent.

What is claimed is:

1. A motorcycle comprising:
   a portable transmitter-receiver carried by a user;
   an ignition switch unit enabling an engine starting operation and causing a handle and a seat of the motorcycle to be unlocked;
   an actuator causing a lock/unlock operation of an accommodation box lid which covers an opening of an accommodation box formed in a leg shield;
   a control unit permitting an operation of the ignition switch unit and activating the actuator to unlock the accommodation box lid in consequence of matching both identification codes stored in the portable transmitter-receiver and the control unit; and
   a key cylinder for emergency unlocking of the ignition switch unit operated by an emergency unlocking key,
   wherein the ignition switch unit, the actuator and the control unit are mounted on an outer surface of an upper wall portion forming a part of the accommodation box,
   wherein the control unit and the key cylinder are disposed on the same side as a prop stand of the motorcycle in the width direction,
   wherein the ignition switch unit and the actuator are disposed on the other side of the prop stand of the motorcycle in the width direction,
   wherein the ignition switch unit enables the seat to be unlocked under the operation by the emergency unlocking key, and
   wherein a distance from a center of the motorcycle to the key cylinder for emergency unlocking, in a width direction, is set longer than a second distance from the center of the motorcycle to the ignition switch unit in the width direction.

2. The motorcycle according to claim 1, wherein the actuator and the control unit are disposed on both sides of the ignition switch unit in the width direction of the motorcycle respectively.

3. The motorcycle according to claim 1, wherein the control unit comprises:
   a transmitting antenna transmitting a request signal in response to an operation of an access switch installed in the ignition switch unit; and
   a receiving antenna receiving a response signal transmitted from the portable transmitter-receiver.

4. A motorcycle comprising:
   a portable transmitter-receiver carried by a user;
   an ignition switch unit enabling an engine starting operation and causing a handle and a seat of the motorcycle to be unlocked;
   an actuator causing a lock/unlock operation of an accommodation box lid which covers an opening of an accommodation box formed in a leg shield;
   a control unit permitting an operation of the ignition switch unit and activating the actuator to unlock the accommodation box lid in consequence of matching both identification codes stored in the portable transmitter-receiver and the control unit; and
   a key cylinder for emergency unlocking of the ignition switch unit operated by an emergency unlocking key,
   wherein the control unit includes a transmitting antenna transmitting a request signal in response to an operation of an access switch installed in the ignition switch unit and a receiving antenna receiving a response signal transmitted from the portable transmitter-receiver,
   wherein the ignition switch unit, the actuator and the control unit are mounted on an outer surface of an upper wall portion forming a part of the accommodation box,
   wherein the control unit and the key cylinder are disposed on the same side as a prop stand of the motorcycle in the width direction,
   wherein the ignition switch unit and the actuator are disposed on the other side of the prop stand of the motorcycle in the width direction,
   wherein the ignition switch unit enables the seat to be unlocked under the operation by the emergency unlocking key, and
   wherein a distance from a center of the motorcycle to the key cylinder for emergency unlocking, in a width direction, is set longer than a second distance from the center of the motorcycle to the ignition switch unit in the width direction.

5. The motorcycle according to claim 4, wherein the actuator is mounted on the outer surface of the upper wall portion forming a part of the accommodation box on the other side of the control unit in the width direction, and
   the ignition switch unit is disposed between the actuator and the control unit in the width direction.

* * * * *